United States Patent Office 2,773,841
Patented Dec. 11, 1956

2,773,841

METHOD OF PREPARING SILICA ALUMINA OR MAGNESIA BASE CATALYSTS

Charles N. Kimberlin, Jr., and Elroy M. Gladrow, Baton Rouge, La., assignors to Esso Research and Engineering Company, a corporation of Delaware No Drawing. Application December 24, 1952,
Serial No. 327,904

15 Claims. (Cl. 252—449)

The present invention pertains to catalysts and particularly to the preparation of catalysts suitable for the reforming or hydroforming of lower boiling hydrocarbons or naphtha fractions into motor fuels of excellent anti-knock and engine cleanliness characteristics.

Hydroforming is a well known process for treating hydrocarbon fractions boiling within the motor fuel or naphtha range to upgrade the same or increase the aromaticity and improve the engine cleanliness and anti-knock characteristics of said fractions. It has been proposed to hydroform such lower boiling hydrocarbons by treating them in the presence of hydrogen or hydrogen-rich recycle gas (i. e. at relatively high hydrogen partial pressure) at pressures up to about 1000 lbs. per sq. in. at temperatures of about 750–1050° F. and in contact with such catalysts as molybdenum oxide, chromium oxide or, in general, oxides or sulfides of metals of groups IV–VIII of the periodic system of elements, alone, or generally supported or dispersed upon a base or spacing agent. Suitable materials for this purpose include activated alumina, alumina gel and zinc aluminate spinel.

It is well known in several catalytic conversions of hydrocarbons that catalysts having the same chemical composition but prepared in different ways may differ widely in their ability to promote certain reactions or hydrocarbon conversions. Previous experience with hydroforming catalysts has shown that the catalyst base or support exerts a strong influence on the ultimate catalyst behaviour or activity of the catalyst. In view of the continued demand for greater volumes or yields of naphtha or motor fuels of higher anti-knock properties, a great deal of research is in progress by many groups in an effort to find new or improved hydroforming techniques and new and better catalysts capable of giving higher yields and/or higher octane number products.

It is the object of this invention to prepare new and improved reforming or hydroforming catalysts.

It is also an object of this invention to prepare hydroforming catalyst supports which when impregnated with an active catalytic component such as molybdenum oxide yield catalysts which give high yields of high octane number gasoline.

It is a further object of this invention to hydroform hydrocarbon fractions in contact with certain novel catalyst compositions to produce high octane number motor fuels in good yields.

These and other objects will appear more clearly from the detailed specification and claims which follow.

It has now been found that the structure of inorganic oxides can be altered very substantially by subjecting these materials in the hydrosol state to elevated temperatures and pressures for various lengths of time. Hydrosols when thus pressure treated and then dried conventionally as at atmospheric pressure and at temperatures of about 250 to 500° F. yield products having markedly lower surface area and substantially the same or only slightly larger pore volume when compared with the products obtained by drying the same hydrosol, but without the high pressure pretreatment, in the same conventional manner. In the case of an alumina sol the straight dried product gave Eta-alumina while the product obtained in accordance with the present invention was Gamma-alumina. Impregnation of the latter product with molybdenum oxide gave a highly selective hydroforming catalyst.

The present invention is applicable to a wide variety of inorganic oxide hydrosols, for example alumina sol prepared by the hydrolysis of aluminum metal in contact with acetic acid and mercury or a mercury salt, or alumina sol prepared by hydrolysis of an aluminum alcoholate such as aluminum amylate, or the like, silica sol produced by the treatment of an alkali metal silicate with an acid or with an acid regenerated cation exchange resin, magnesia sol produced by the careful hydrolysis of magnesium methylate, and stabilized sols such as alumina sol to which is added 0.5 to 0.5% (based on alumina) of chromia, zirconia, or silica. These stabilizers may be added in the form of soluble salts or hydrosols. The concentration of the hydrosol to be treated is preferably as high as possible while avoiding gelation during the heating treatment; about 6% concentration for alumina sols and about 5% concentration for silica sols is the maximum practical. The pH of alumina sols may be in the range of about 4 to 6; the pH of silica sols may be in the range of about 3 to 5.5.

The pressure treatment of the hydrosols may be effected at pressures within the range of from about 15 to about 1000 lbs. per sq. inch gauge and at temperatures from about 212 to about 550° F. The time periods for the pressure treatment may vary from a few minutes to about 24 hours depending on the choice of the other variables. The temperature employed is that required to maintain the desired pressure on the treating system. The time of treatment required to effect a given alteration of structure of the colloidal material will depend both upon the nature of the hydrosol being treated and the pressure (and temperature) of the treatment. For example, for a given percentage change in surface area more concentrated hydrosols require a less severe treatment than more dilute hydrosols, and alumina hydrosol reqiures slightly less severe treatment than silica hydrosol of the same concentration. The time required to effect a given alteration in the structure of any hydrosol decreases rapidly with increasing pressure (and temperature); for example, 9 hours at 100 p. s. i. g. (pounds per square inch gauge) are approximately equivalent to 3 hours at 200 p. s. i. g. or to 1 hour at 600 p. s. i. g.

The pressure treated hydrosol is cooled and brought down to atmospheric pressure preparatory to drying or converting to solid gel.

The pressure treated hydrosol or the gel obtained thereform by drying is then composited with an active catalytic component such as, for example, a Group VI metal oxide such as molybdenum oxide, chromium oxide, tungsten oxide, or a Group V metal oxide such as vanadium oxide or the like. Preferred catalysts of this type contain about 5 to 15 wt. percent of molybdenum oxide or from about 10 to 40 wt. percent chromium oxide. Good reforming catalysts are also obtained by the incorporation of about 0.1 to about 2.0% platinum or about 0.5 to about 5.0 wt. percent palladium. Small amounts of stabilizers or promoters such as silica, ceria, potassia and the like can be included in the catalyst. The incorporation of the active catalytic component can be effected in any known or conventional manner. For example, molybdenum oxide-containing catalysts can be prepared by adding molybdenum oxide or a compound capable of yielding molybdenum oxide on heating such as ammonium molybdate to the pretreated hydrosol or to the gel. The composite is ordinarily heated or calcined to activate it prior to or during charging to the reactor vessel.

Catalysts prepared in this manner are valuable for the reforming or hydroforming of hydrocarbon fractions. The hydrocarbon feed can be a virgin naphtha, a cracked naphtha or the like having a boiling range of from about 125 to 450° F. or it may be a narrow boiling cut within this range. The reforming may be effected in a fixed or moving bed or in a fluidized solids reactor system at pressures from about atmospheric to about 1000 lbs. per sq. inch preferably 50–750 lbs. per sq. inch and at temperatures from about 800–1000° F., preferably 850–950° F. Hydrogen or hydrogen-rich recycle gas is charged to the reaction zone at the rate of from about 1000 to about 10,000 cu. ft. per barrel of feed. The hydrogen-rich gas is ordinarily preheated to about 1100–1200° F. in order to supply heat to the reaction zone, the hydrogen also serving to minimize carbon formation. The space velocity or the weight in pounds of feed charged per hour per pound of catalyst in the reactor depends upon the age or activity level of the catalyst, the character of the feed stock and the desired octane number of the product and may vary from about 0.15 to 1.5.

The following examples are illustrative of the present invention:

Example I

A 40 Bé. commercial solution of water glass $$(Na_2O.3.25SiO_2)$$

is diluted with about 11.5 times its own volume of water. The diluted solution is percolated through a column of acid regenerated Amberlite IR–120 cation exchange resin at a flow rate of about 1.35 gallons per minute per square foot cross sectional area of exchange column. The depth of the exchange column is about 4 feet. Amberlite IR–120 is a commercial cation exchange resin supplied by the Rohm and Haas Company of Philadelphia; this material is believed to be a polymeric condensation product of a phenol sulfonic acid and an aldehyde. However, other cation exchange resins may be employed such as sulfonated coal or sulfonated polystyrene, etc. After a total of about 26 gallons of dilute sodium silicate solution has been passed through the column per cubic foot of resin, the flow is discontinued. The product comprises a soda-free silica hydrosol comprising about 3% silica. The exchange column is washed with about twice its volume of water and then treated with 5% sulfuric acid using about 5.5 gallons of 5% acid per cubic foot of resin. The acid treated resin is washed with water using about 15 gallons of water per cubic foot of resin. The exchange column is now ready for making more silica hydrosol.

A portion of the 3% silica hydrosol described above is dried in a steam heated oven at about 250° F. and activated by heating 16 hours at 1000° F. The resulting gel has a surface area of about 670 square meters per gram and a pore volume of about 0.31 cc. per gram.

Example II

A stainless steel autoclave is charged to one-half its capacity with the 3% silica hydrosol prepared by ion exchange as described in Example I. The autoclave is rapidly heated to about 390° F. or a pressure of about 200 p. s. i. g. About one hour is required to heat the autoclave to the temperature required for 200 p. s. i. g. pressure. Heating is continued at a pressure of 200 p. s. i. g. for 4 hours after which the autoclave is cooled and the pressure treated hydrosol is withdrawn. The pressure treated hydrosol is quite fluid and has an opalescent appearance. The pressure treated hydrosol is dried in a steam heated oven at about 250° F. and activated by heating for 16 hours at 1000° F. The resultant gel has a surface area of about 414 square meters per gram. This material is useful as an adsorbent and as a catalyst base. In place of drying the treated hydrosol it may be employed as a source of silica for the stabilization of alumina.

Example III

A stainless steel autoclave is charged to one-half its capacity with the 3% silica hydrosol prepared by ion exchange as described in Example I. The autoclave is rapidly heated to about 490° F. or a pressure of about 600 p. s. i. g. About 2 hours are required to heat the autoclave to the desired pressure. Heating is continued at a pressure of 600 p. s. i. g. for 2 hours after which the autoclave is cooled and the pressure treated hydrosol is withdrawn. The pressure treated hydrosol is quite fluid and has an opalescent appearance. The pressure treated hydrosol is dried in a steam heated oven at about 250° F. and activated by heating for 16 hours at about 1000° F. The resulting gel has a surface area of about 354 square meters per gram and a pore volume of about 0.34 cc. per gram. This gel is useful as an adsorbent and as a catalyst base.

Example IV

An alumina hydrosol is prepared by the alcoholate method as follows. Fifty-four pounds of aluminum metal in the form of turnings are dissolved in about 124 gallons of a 50/50 mixture of mixed amyl alcohols and petroleum naphtha boiling in the range of about 200 to 300° F. About 1/10 ounce of mercuric chloride is used as a catalyst for the reaction between aluminum and the amyl alcohol. It is necessary to heat the mixture to start the reaction between the metal and the alcohol, but after the reaction is started cooling is necessary. After the reaction is complete the solution of aluminum amylate is hydrolyzed by mixing with a solution of 4 gallons of acetic acid in about 396 gallons of water at a temperature of about 80° F. The hydrolyzed mixture is allowed to settle into an upper layer of regenerated amyl alcohol and petroleum naphtha and a lower layer of alumina sol. The latter is withdrawn and stripped of its small content of dissolved and entrained amyl alcohol and naphtha by blowing with steam. The resulting alumina hydrosol comprises about 3% alumina. The regenerated amyl alcohol and naphtha mixture is dried by distillation for re-use.

A portion of the above alumina sol is dried in a steam heated oven at about 250° F. and activated by heating for 6 hours at about 1200° F. The resulting alumina gel has a surface area of about 242 square meters per gram and a pore volume of about 0.44 cc. per gram. X-ray examination shows that this alumina exists in the eta crystalline phase.[1] This alumina gel is converted into a hydroforming catalyst by impregnating with a solution of ammonium molybdate using about 1.35 lbs. of ammonium molybdate dissolved in 3 quarts of water for each 10 pounds of alumina. After impregnation the catalyst is re-dried at about 250° F. and re-activated 6 hours at 1200° F. This catalyst comprises about 10% molybdena and is designated catalyst "A."

Example V

A stainless steel autoclave is charged to one-half its volume with 3% alumina hydrosol prepared as described in Example IV. The autoclave is rapidly heated to a pressure of about 600 p. s. i. g. (490° F.); about 2 hours are required for heating up the autoclave. Heating is continued at 600 p. s. i. g. for 2 hours after which the autoclave is cooled and the pressure treated hydrosol is discharged. The pressure treated hydrosol is quite fluid and is opaque. The pressure treated hydrosol is dried in a steam heated oven at about 250° F. and activated by heating 6 hours at 1200° F. The resulting alumina gel has a surface area of about 116 square meters per gram and a pore volume of about 0.55 cc. per gram. X-

---

[1] (Stumpf has described the various crystalline phases of alumina: Industrial and Engineering Chemistry, vol. 42, pages 1398 et seq., July 1950.)

ray examination shows the alumina to be in the gamma crystalline phase. Experience has shown that the gamma phase of alumina bases is favorable for the production of hydroforming catalysts having good selectivity for the production of high yields of high octane number gasolines. This alumina gel is converted into a hydroforming catalyst by impregnation with a solution of ammonium molybdate using about 1.35 pounds of ammonia molybdate dissolved in 3 quarts of water for each 10 pounds of alumina. After impregnation the catalyst is re-dried at about 250° F. and re-activated 6 hours at 1200° F. This catalyst comprises about 10% molbdena and is designated catalyst "B."

*Example VI*

Fifty-four pounds of aluminum metal are converted into alcoholate as described in Example IV. About 4 gallons of glacial acetic acid is added to the anhydrous alcoholate solution and this is immediately hydrolyzed with about 190 gallons of water. Alumina hydrosol is recovered as in Example IV. This hydrosol comprises about 6% alumina. A portion of the hydrosol is dried in an oven at about 250° F. and activated 6 hours at about 1200° F. X-ray examination shows the resulting alumina gel to be in the eta crystalline phase. The alumina gel has a surface area of about 216 square meters per gram and a pore volume of about 0.38 cc. per gram.

*Example VII*

A stainless steel autoclave is charged to one-half its volume with 6% alumina hydrosol prepared as described in Example VI. The autoclave is rapidly heated to about 600 p. s. i. g. pressure (490° F.); about 2 hours are required for heating up the autoclave. Heating is continued at about 600 p. s. i. g. for 2 hours after which the autoclave is cooled and the pressure treated hydrosol is discharged. The treated hydrosol is quite fluid and is opaque. The pressure treated hydrosol is dried in an oven at about 250° F. and activated 6 hours at about 1200° F. The resulting alumina gel has a surface area of about 84 square meters per gram and a pore volume of about 0.45 cc. per gram. X-ray examination shows that the alumina is in the gamma crystalline phase.

*Example VIII*

Catalysts "A" and "B'" described in Examples IV and V are employed in the form of 3/16 inch x 3/16 inch cylindrical pellets in a fixed catalyst bed operation for the hydroforming of a 200° F. to 330° F. boiling range virgin naphtha from mixed Southeast and West Texas crudes. The conditions employed are 900° F. temperature, 200 p. s. i. g. pressure, using 1500 cubic feet of feed hydrogen per barrel of naphtha feed, and a naphtha feed rate of approximately one volume of naphtha per volume of catalyst per hour; slight adjustments are made in the feed rate in order to obtain a $C_6^+$ product with each catalyst having an aniline point of 10° F. The yields of $C_6^+$ products are shown in the tabulation below.

| Catalyst | "A" | "B" |
|---|---|---|
| Aniline Point of $C_6^+$ product, °F | 10 | 10 |
| Yield of $C_6^+$ product, Vol. percent | 70.7 | 73.6 |

The foregoing description contains a limited number of embodiments of the present invention. It will be understood, however, that numerous variations are possible without departing from the scope of the following claims.

What is claimed is:

1. A process which comprises preparing a hydrosol selected from the group consisting of alumina hydrosol, silica hydrosol and magnesia hydrosol, subjecting the said hydrosol to pressures from about 15 to 1000 lbs. per sq. inch gauge and temperatures from about 212 to about 550° F. for periods of from a few minutes up to about 24 hours, cooling and depressuring the hydrosol and converting the hydrosol to dry gel, said gel having markedly lower surface area and substantially the same or only slightly larger pore volume when compared with the products obtained by drying the same hydrosol in the same manner but without the high pressure treatment.

2. A process which comprises preparing an alumina hydrosol, subjecting the said hydrosol to pressures from about 15 to 1000 lbs. per sq. inch gauge and temperatures from about 212 to about 550° F. for periods of from a few minutes up to about 24 hours, cooling and depressuring the hydrosol and converting the hydrosol to dry gel, said gel having markedly lower surface area and substantially the same or only slightly larger pore volume when compared with the products obtained by drying the same hydrosol in the same manner but without the high pressure treatment.

3. A process which comprises preparing an alumina hydrosol by hydrolysis of aluminum metal in contact with acetic acid and a catalytic amount of mercury, subjecting the said hydrosol to pressures from about 15 to 1000 lbs. per sq. inch gauge and temperatures from about 212 to about 550° F. for periods of from a few minutes up to about 24 hours, cooling and depressuring the hydrosol and converting the hydrosol to dry gel, said gel having markedly lower surface area and substantially the same or only slightly larger pore volume when compared with the products obtained by drying the same hydrosol in the same manner but without the high pressure treatment.

4. A process which comprises preparing an alumina hydrosol by hydrolysis of an aluminum alcoholate, subjecting the said hydrosol to pressures from about 15 to 1000 lbs. per sq. inch gauge and temperatures from about 212 to about 550° F. for periods of from a few minutes up to about 24 hours, cooling and depressuring the hydrosol and converting the hydrosol to dry gel, said gel having markedly lower surface area and substantially the same or only slightly larger pore volume when compared with the products obtained by drying the same hydrosol in the same manner but without the high pressure treatment.

5. A process which comprises preparing a silica hydrosol, subjecting the said hydrosol to pressures from about 15 to 1000 lbs. per sq. inch gauge and temperatures from about 212 to about 550° F. for periods of from a few minutes up to about 24 hours, cooling and depressuring the hydrosol and converting the hydrosol to dry gel, said gel having markedly lower surface area and substantially the same or only slightly larger pore volume when compared with the products obtained by drying the same hydrosol in the same manner but without the high pressure treatment.

6. A process which comprises preparing a silica hydrosol by contacting an alkali metal silicate solution with an acid regenerated cation exchange resin, subjecting the said hydrosol to pressures from about 15 to 1000 lbs. per sq. inch gauge and temperatures from about 212 to about 550° F. for periods of from a few minutes up to about 24 hours, cooling and depressuring the hydrosol and converting the hydrosol to dry gel, said gel having markedly lower surface area and substantially the same or only slightly larger pore volume when compared with the products obtained by drying the same hydrosol in the same manner but without the high pressure treatment.

7. A process which comprises preparing magnesia hydrosol, subjecting the said hydrosol to pressures from about 15 to 1000 lbs. per sq. inch gauge and temperatures from about 212 to about 550° F. for periods of from a few minutes up to about 24 hours, cooling and depressuring the hydrosol and converting the hydrosol to dry gel, said gel having markedly lower surface area and substantially the same or only slightly larger pore volume when compared with the products obtained by drying the same hydrosol in the same manner but without the high pressure treatment.

8. A process which comprises preparing a hydrosol selected from the group consisting of alumina hydrosol, silica hydrosol and magnesia hydrosol, subjecting the said hydrosol to pressures from about 15 to 1000 lbs. per sq. inch gauge and temperatures from about 212 to about 550° F. for periods of from a few minutes up to about 24 hours to lower the surface area and increase the pore volume of gels obtainable therefrom, cooling the pressure treated hydrosol, depressuring the cooled hydrosol, converting the pressure treated hydrosol to hydrogel, drying and heating or calcining the said inorganic oxide to activate the same.

9. A process which comprises preparing an alumina hydrosol, subjecting the said hydrosol to pressures from about 15 to 1000 lbs. per sq. inch gauge and temperatures from about 212 to about 550° F. for periods of from a few minutes up to about 24 hours to lower the surface area and increase the pore volume of gels obtainable therefrom, cooling the pressure treated hydrosol, depressuring the cooled hydrosol, converting the pressure treated hydrosol to hydrogel, drying and heating or calcining said alumina hydrogel to activate the same.

10. A process which comprises preparing a silica hydrosol, subjecting the said hydrosol to pressures from about 15 to 1000 lbs. per sq. inch gauge and temperatures from about 212 to about 550° F. for periods of from a few minutes up to about 24 hours to lower the surface area and increase the pore volume of gels obtainable therefrom, cooling the pressure treated hydrosol, depressuring the cooled hydrosol, converting the pressure treated hydrosol to hydrogel, drying and heating or calcining said silica hydrogel to activate the same.

11. A process which comprises preparing magnesia hydrosol, subjecting the said hydrosol to pressures from about 15 to 1000 lbs. per sq. inch gauge and temperatures from about 212 to about 550° F. for periods of from a few minutes up to about 24 hours to lower the surface area and increase the pore volume of gels obtainable therefrom, cooling the pressure treated hydrosol, depressuring the cooled hydrosol, converting the pressure treated hydrosol to hydrogel, drying and heating or calcining said magnesia hydrogel to activate the same.

12. A process for preparing hydrocarbon conversion catalysts which comprises preparing a hydrosol selected from the group consisting of alumina hydrosol, silica hydrosol and magnesia hydrosol, subjecting the said hydrosol to pressures from about 15 to 1000 lbs. per sq. inch gauge and temperatures from about 212 to about 550° F. for periods of from a few minutes up to about 24 hours to lower the surface area and increase the pore volume of gels obtainable therefrom, cooling the pressure treated hydrosol, depressuring the cooled hydrosol, converting the pressure treated hydrosol to hydrogel, impregnating the resultant inorganic oxide hydrogel with an active catalytic component and heating or calcining the resultant composite to activate the same.

13. A process for preparing hydrocarbon conversion catalysts which comprises preparing an alumina hydrosol, subjecting the said hydrosol to pressures from about 15 to 1000 lbs. per sq. inch gauge and temperatures from about 212 to about 550° F. for periods of from a few minutes up to about 24 hours to lower the surface area and increase the pore volume of gels obtainable therefrom, cooling the pressure treated hydrosol, depressuring the cooled hydrosol, converting the pressure treated hydrosol to hydrogel, impregnating the resultant alumina hydrogel with an active catalytic component and heating or calcining the resultant composite to activate the same.

14. A process for preparing hydrocarbon conversion catalysts which comprises preparing a silica hydrosol, subjecting the said hydrosol to pressures from about 15 to 1000 lbs. per sq. inch gauge and temperatures from about 212 to about 550° F. for periods of from a few minutes up to about 24 hours to lower the surface area and increase the pore volume of gels obtainable therefrom, cooling the pressure treated hydrosol, depressuring the cooled hydrosol, converting the pressure treated hydrosol to hydrogel, impregnating the resultant silica hydrogel with an active catalytic component and heating or calcining the resulting composite to activate the same.

15. A process for preparing hydrocarbon conversion catalysts which comprises preparing magnesia hydrosol, subjecting the said hydrosol to pressures from about 15 to 1000 lbs. per sq. inch gauge and temperatures from about 212 to about 550° F. for periods of from a few minutes up to about 24 hours to lower the surface area and increase the pore volume of gels obtainable therefrom, cooling the pressure treated hydrosol, depressuring the cooled hydrosol, converting the pressure treated hydrosol to hydrogel, impregnating the resultant magnesia hydrogel with an active catalytic component and heating or calcining the resultant composite to activate the same.

References Cited in the file of this patent

UNITED STATES PATENTS

| | | |
|---|---|---|
| 1,772,055 | Miller | Aug. 5, 1930 |
| 1,923,726 | Heghinian | Aug. 22, 1933 |
| 2,317,803 | Reeves | Apr. 27, 1943 |
| 2,358,202 | Behrman | Sept. 12, 1944 |
| 2,378,155 | Newsome et al. | June 12, 1945 |
| 2,406,320 | Weiser et al. | Aug. 27, 1946 |
| 2,468,857 | Anderson et al. | May 3, 1949 |
| 2,478,674 | Tamele et al. | Aug. 9, 1949 |
| 2,642,337 | Newsome | June 16, 1953 |
| 2,686,159 | Webb | Aug. 10, 1954 |
| 2,698,305 | Plank et al. | Dec. 28, 1954 |